B. D. CHAMBERLIN.
MOLD FOR GLASS BLOWING MACHINES.
APPLICATION FILED APR. 20, 1911.
1,156,058.
Patented Oct. 12, 1915.
3 SHEETS—SHEET 1.
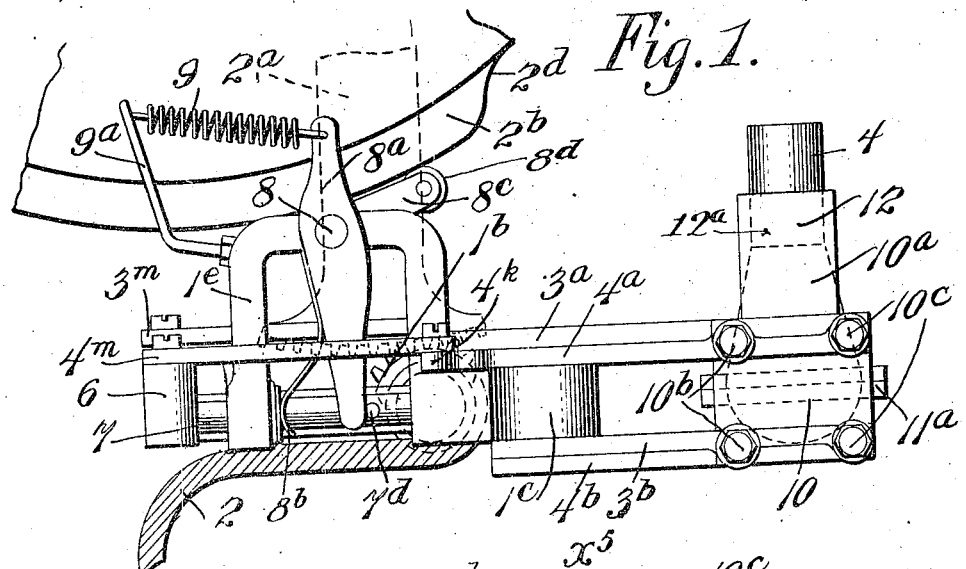
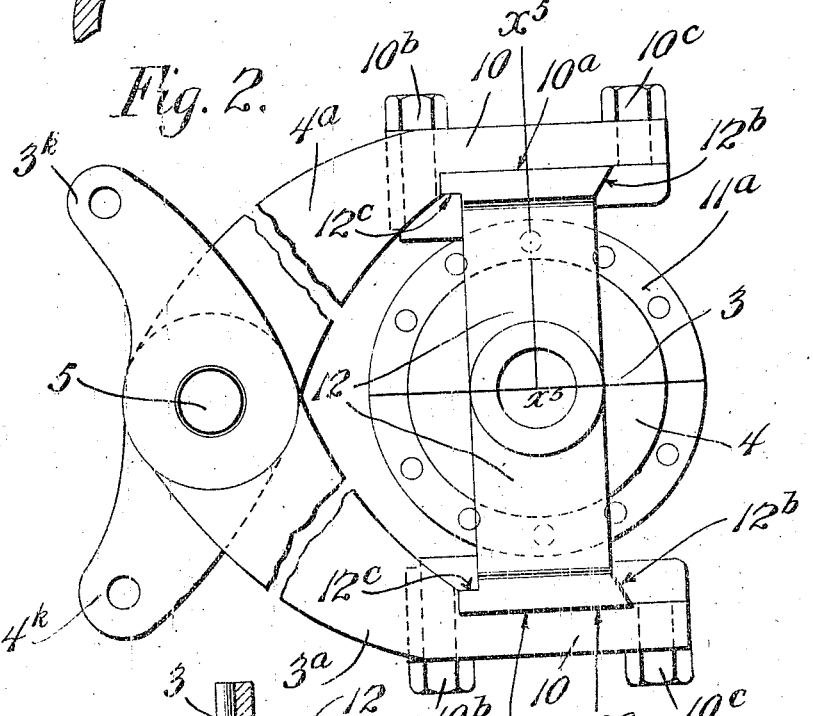
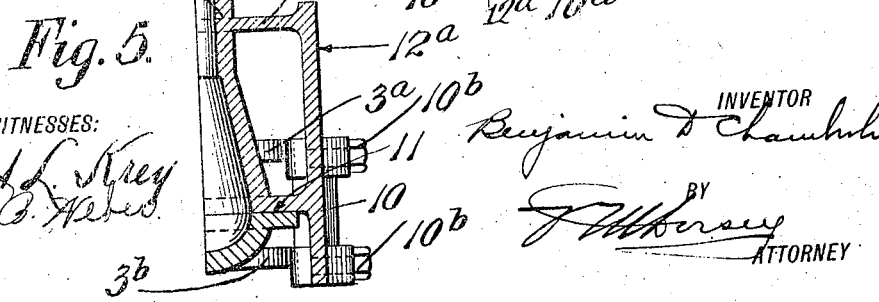

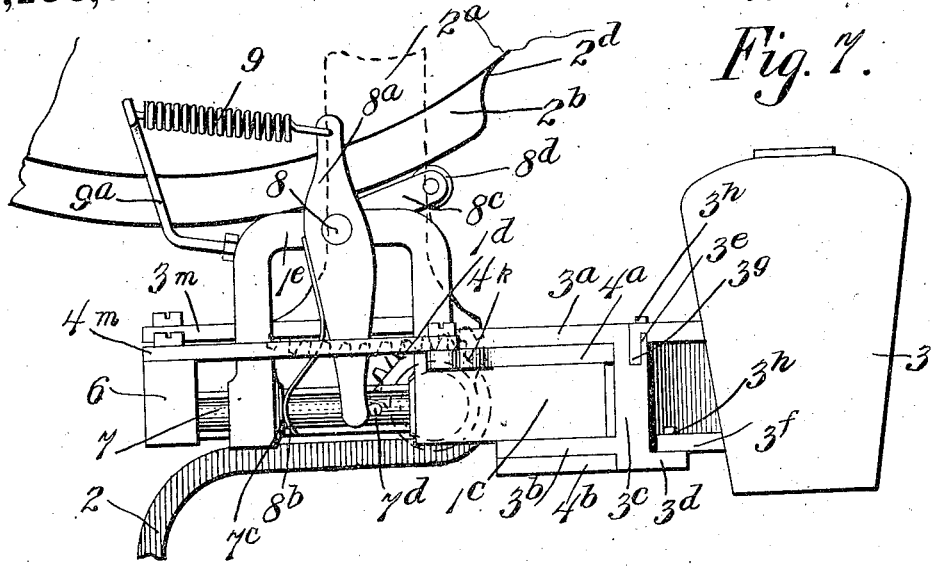

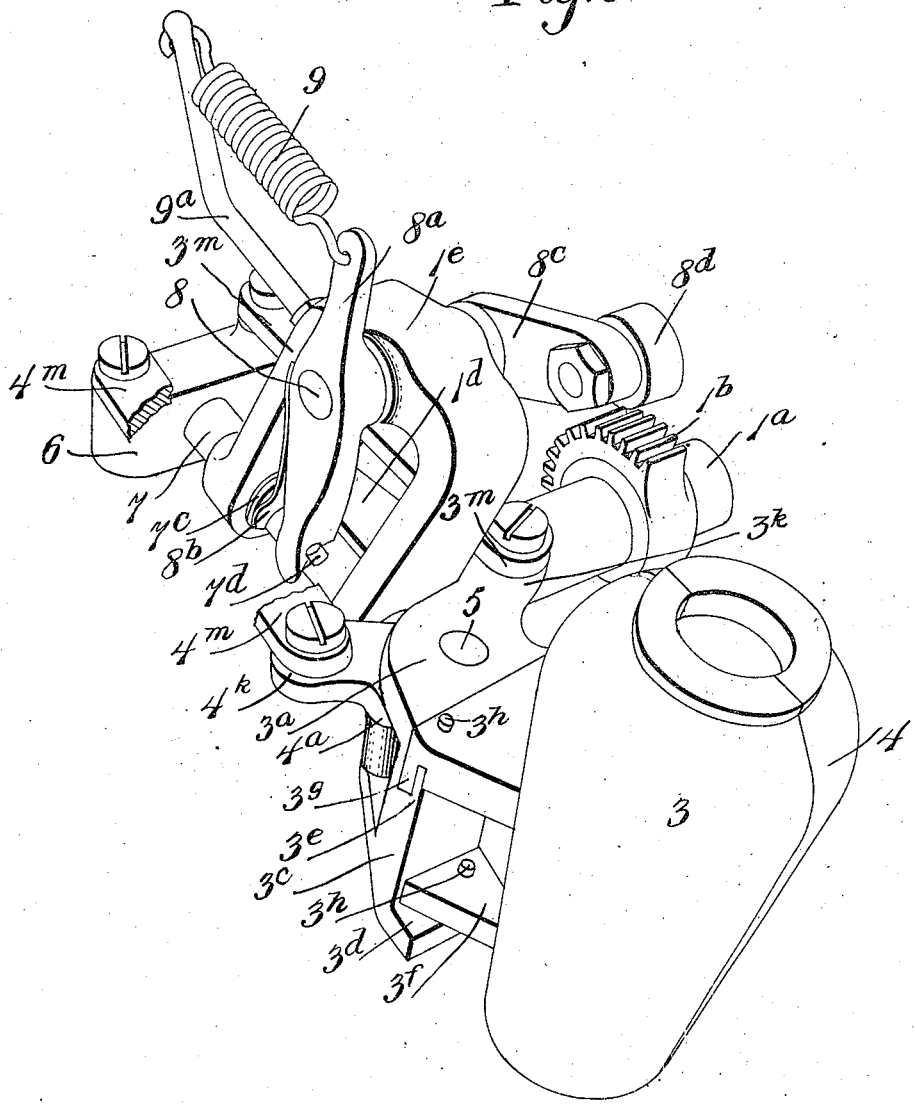

UNITED STATES PATENT OFFICE.

BENJAMIN DAY CHAMBERLIN, OF CORNING, NEW YORK, ASSIGNOR TO EMPIRE MACHINE COMPANY, OF PORTLAND, MAINE, A CORPORATION OF MAINE.

MOLD FOR GLASS-BLOWING MACHINES.

1,156,058.     Specification of Letters Patent.     Patented Oct. 12, 1915.

Application filed April 20, 1911. Serial No. 622,391.

*To all whom it may concern:*

Be it known that I, BENJAMIN D. CHAMBERLIN, a citizen of the United States of America, and a resident of Corning, New York, have invented certain new and useful Improvements in Molds for Glass-Blowing Machines, of which the following is a specification.

My invention has for its object to provide a construction for blowing molds such as will insure accuracy and smoothness of their action, a minimum of power to operate them, and simplicity of construction, the operation to be performed being a closing and opening of the mold, a dropping of the mold to permit the cooling of the same by a water bath and the restoration of the mold to its normal position. For this purpose it consists essentially of a horizontally journaled frame, having a knuckle upon which the mold parts are pivoted and carrying the mold opening and closing mechanism. Thus the molds and their actuating mechanism all rotate together around the axis of the frame so that such parts are self contained and may be removed from and replaced as a whole, in any appropriate blowing machine, such for instance as that shown by me in my other application filed 13th day of January, 1911, Serial No. 602,532, Patent No. 1,124,698, issued Jan. 12, 1915.

My invention further consists of means whereby the mold proper may be readily removed from or replaced in the mold mechanism, (whereby the same mechanism may be used in connection with molds of various shapes), and for this purpose it consists in hinge members separate and distinct from the mold proper and of means for readily and firmly securing them together and in its preferred form it further consists in means whereby the mold halves may be adjusted on their hinges to accommodate blow-pipes of various lengths.

Referring to the accompanying drawings in which corresponding parts are designated by corresponding marks of reference, Figure 1 is a side elevation of a mold mechanism constructed in accordance with this invention and showing in full and dotted lines respectively, proper actuating parts of a blowing machine, such for instance that disclosed in my aforesaid application. Fig. 2 is a partial plan view of the molds and mold hinges. Fig. 3 is a plan view partly in section of the knuckle frame. Fig. 4 is an end view thereof. Fig. 5 is a front view of a vertical half section on line $x^5$—$x^5$ of Fig. 2. Fig. 6 is a perspective view of a structure embodying a mold actuating mechanism constructed in accordance with this invention, and showing a different form of connection between the mold and mold hinges, a mold for a different article being shown. Fig. 7 is a side elevation of the structure shown in Fig. 6.

The trunnion $1^a$ of the knuckle frame 1 is horizontally journaled in the base 2 of a blowing machine, and is provided with a segmental pinion $1^b$ adapted to be engaged by the segmental rack $2^a$, forming a part of the blowing machine, whereby the knuckle frame can be given angular movement around its horizontal axis as it is fully disclosed in my said prior application, this being for the purpose of dipping the mold. The outer end of the trunnion has projecting forwardly therefrom the knuckle $1^c$ and has in the rear thereof the cross bar $1^d$, which unites and supports the lower ends of the vertical legs of a yoke lever $1^e$. By preference these parts are all formed integral except the segmental pinion $1^b$.

Straddling the knuckle $1^c$ are the top and bottom plates $3^a$ and $4^a$, and $3^b$ and $4^b$, respectively, of the two mold hinges respectively, the hinges also straddling each other as shown in Fig. 1. The hinges carrying the mold halves 3 and 4 are pivoted upon the knuckle by the pin 5, which is at right angles to the trunnion $1^a$. The upper plates $3^a$ and $4^a$ of the mold hinges have ears $3^k$ and $4^k$ projecting rearwardly therefrom, such projections being upon opposite sides of the front vertical leg of the yoke 1. These ears are connected to the forward ends of links $3^m$ and $4^m$, the rear ends of which are pivoted to the opposite ends of the crosshead 6 located behind the rear vertical leg of the yoke $1^e$, and carried on the rear end of a bar 7 mounted to slide at right angles to the trunnion and the pivot of the mold, in bearings in the lower ends of the said yoke. By this construction the rearward movement of the cross-head will result in the closing of the mold, due to the fact that the ears $3^k$ and $4^k$ are upon the opposite sides of the pivotal point from the mold half to which they are connected. The sliding bar is actuated by means of a shaft 8 mounted in the top of the yoke parallel with the trunnion, the shaft having upon its outer end a crank 8ª, carrying a rearwardly projecting spring 8ᵇ bearing upon the front face of the collar 7ᶜ rigidly fixed upon a rod 7. The shaft has upon its inner end an actuating crank 8ᶜ carrying a roller 8ᵈ which is moved by a suitable part of a blowing machine, such as the cam 2ᵇ, which is fully described in my prior application. It will be seen that the depression of the roller 8ᵈ by the cam 2ᵇ will result in a rearward movement of the cross-head and the closing of the mold, the spring 8ᵇ being interposed in the driving connection to provide the resiliency necessary in this operation.

For the purpose of opening the mold, a projection 7ᵈ is formed upon the bar 7 and in front of the lower end of the arm 8ª, which arm extends above the axis of the shaft 8 and is secured to the forward end of a spring 9, the rear end of which is connected to the bracket 9ª projecting rearwardly from the yoke. This spring serves to hold the roller 8ᶜ up toward the cam, and when, in the rotation of the cam, the cutaway portion 2ᵈ thereof comes opposite the roller, to open the mold.

In Figs. 1 to 5 I have shown a connection between the mold halves and mold hinges by which not only can mold halves be interchanged on the hinges, but they can be varied in elevation thereon to accommodate blow-pipes of different lengths. In these figures the front ends of the mold hinged plates 3ª and 3ᵇ and 4ª and 4ᵇ, are connected by vertical webs 10 which have machined inner opposing faces 10ª. The mold halves 3 and 4 may be each cast in two pieces divided horizontally at 11, each part having a circular flange 11ª thereon around its abutting face, by which the parts may be fastened together. A web 12 is formed on the upper part of each mold half, projecting laterally therefrom and projecting downwardly to near the level of the base of the mold, the vertical faces 12ª, 12ᵇ and 12ᶜ of the web being machined. The lateral face 12ª of each web 12 fits against the machined face 10ª of the web 10 of the corresponding mold hinge, and the mold half is held in position by clamp bolts 10ᵇ and 10ᶜ passing through the web 10, the heads of which bolts bear against the faces 12ᵇ and 12ᶜ of the mold web. By their construction not only can the molds be readily interchanged on the mold supports, but the molds may be shifted vertically as may be necessitated by the length of the blow irons employed.

In Figs. 6 and 7 I have shown a form of connection between the mold hinges and molds, which while it does not permit variation of elevation of a mold permits the interchanging of the mold parts. In these figures the upper and lower plates of each hinge are connected in front of the knuckle by means of a transverse web, the web for the hinge of the mold half 3 being shown at 3ᶜ, (Fig. 7) and terminating at its lower edge in the forwardly projecting flange 3ᵈ, and having a groove in its upper face, forming a tongue 3ᵉ. The hinge of the mold half 4 is of the same general construction. The mold halves 3 and 4 are of the desired internal contour and each has upon its rear face a bracket 3ᶠ, the bottom flange of which is adapted to rest upon the flange 3ᵈ, while its upper flange is provided with a tongue 3ᵍ, adapted to engage the corresponding tongue 3ᵉ of the vertical member 3ᶜ of the corresponding hinge part, whereby the molds will be supported. For the purpose of locking the molds firmly to their hinge parts taper pins 3ʰ may be employed.

Having thus described my invention what I claim and desire to secure by Letters Patent is:

1. In a mold for a glass blowing machine, the combination of a mold support mounted to turn about an axis for dipping the mold, mold parts pivoted upon the said support at right angles to the axis thereof, a bar sliding in the support at right angles to the axes of the support and of the mold and connected to the mold parts, a shaft mounted in the support parallel to the axis of the support, and a connection between the said shaft and bar for controlling the movement of the said bar.

2. In a mold for a glass blowing machine, the combination of a mold support mounted to turn about a horizontal axis for dipping the mold, and having upon its end a knuckle upon one side of its axis and a yoke upon its opposite side, mold parts pivoted on the knuckle at right angles to the axis of the support, a bar slidingly mounted in the yoke, means for actuating the said bar and a connection between the bar and mold parts for controlling the opening and closing of the mold.

3. In a mold for a glass blowing machine, the combination of a mold support mounted to turn about a horizontal axis for dipping the mold and having upon its end a knuckle upon one side of its axis and a yoke upon its opposite side, mold parts pivoted on the knuckle at right angles to the axis of the support, a bar sliding in the yoke at right angles to the axis thereof and of the mold parts, a connection between the said bar and mold parts, a shaft mounted in the yoke parallel to the axis of the support, and a connection between the shaft and bar to actuate the sliding bar and means for oscillating the shaft.

4. In a mold for a glass blowing machine, the combination of a mold support mounted to turn about a horizontal axis for dipping the mold and having upon its end a knuckle upon one side of its axis and a yoke upon its opposite side, mold parts pivoted on the knuckle at right angles to the axis of the support, a bar slidingly mounted in the yoke, a cross-head mounted on the said bar and connected to the mold parts, a shaft mounted in the yoke parallel to the axis of said support and having on one end thereof an arm adapted to actuate the bar to control the opening and closing movements of the mold, and another arm upon the opposite end thereof by which it may be actuated.

5. In a mold for a glass blowing machine the combination of a mold support mounted to turn about a horizontal axis for dipping the mold and having upon its end a knuckle upon one side of its axis and a yoke upon its opposite side, mold parts pivoted on the knuckle at right angles to the axis of the support, a bar slidingly mounted in the yoke, a cross-head mounted on the said bar and connected to the mold parts, a shaft mounted in the yoke parallel to the axis thereof and having on one end thereof an arm adapted to actuate the bar to control the opening and closing movements of the mold and another arm upon the opposite end thereof by which it may be actuated, a spring interposed between the first named arm and the bar and through which the mold is closed, and a spring connected to the last named arm for opening the mold.

In testimony whereof I have signed my name in the presence of two witnesses.

BENJAMIN DAY CHAMBERLIN.

Witnesses:
  G. WILLIS DRAKE,
  R. H. CURTIS.